Patented Dec. 14, 1948

2,456,313

UNITED STATES PATENT OFFICE

2,456,313

PIGMENT COMPOSITIONS

Burt Carlton Pratt, Brandywine Hundred, Del., assignor to E. I. du Pont de Nemours & Company, Wilmington, Del., a corporation of Delaware No Drawing. Application February 16, 1944, Serial No. 522,667

3 Claims. (Cl. 106—290)

This invention relates to metallic pigment compositions, and more particularly to improved coating compositions and films therefrom containing flaked metal pigment.

Metallic paints are of considerable technical importance. It has long been known that, in order to obtain metallic coatings of high brightness (desirable in the production of artistic affects and of certain physical effects such as the reduction of heat reflectance from hot surfaces) the metal flakes in the paint film should be oriented; i. e., a large proportion of the flakes should lie in the same direction with respect to the plane of the film rather than in all directions at random. In general, the brightness of the film is proportional to the degree of orientation, also called "leafing."

As disclosed in application Serial No. 522,666 now matured into Patent No. 2,418,479, filed of even date herewith by myself and Paul L. Salzberg, it has been found that ferromagnetic flake, or mixtures of ferromagnetic flake and non-magnetic pigment, can be oriented in a film containing the same by rotating the film in the plane of a magnetic field.

This invention has as an object the production of new flake metal pigment compositions. A further object is the provision of pigments comprising non-ferromagnetic flake metal which is responsive to the action of a magnetic field. A still further object is the manufacture of valuable film-forming compositions containing flake metal pigment. Other objects will appear hereinafter.

The above objects are accomplished by preparing in the manner more particularly described hereinafter mixtures of finely divided non-magnetic flake metal pigment and ferromagnetic pigment, and by the formulation of compositions comprising these pigment mixtures and a film-forming vehicle.

Although the flake of the metal pigment mixtures described herein can be oriented or leafed by the usual methods of brushing or knifing in film formation, the compositions of this invention are of particular value in connection with the magnetic method of orientation previously referred to because very high orientation can be obtained in films in which the pigment consists preponderantly of non-ferrous metal.

In the preferred practice of the invention the non-magnetic pigment is coated with the magnetic pigment, as shown in Example I below, since the responsiveness of the total pigment to a magnetic field is enhanced thereby. However, this is not essential, and an intimate mixture of non-magnetic and magnetic pigments, as shown in Example II, has been found to be well adapted to magnetic orientation.

The invention is illustrated by the following examples in which parts are by weight unless otherwise specified.

Example I

A mixture of 50 parts of magnetite (magnetic iron oxide) and 40 parts of a hydrocarbon plasticizer marketed by the Wilmington Chemical Company under the trade name "Naftolen R–100" and consisting of aromatic and cycloaliphatic hydrocarbons is milled on a 3 roll mill in sufficient passes to produce a well dispersed paint. Six parts of the resulting paint is added with stirring to a paste of 30 parts of fine aluminum bronze powder (flake) in 35 parts of carbon tetrachloride. After the composition is well mixed, 27 parts of a 15% solution of polystyrene in xylene, 4 parts of the same hydrocarbon plasticizer and 25 parts of carbon tetrachloride are added and the mixture is stirred until homogeneous. The resulting paint, in which the magnetite/aluminum powder ratio is 10/90, the pigment/binder ratio is 75/25, and the polystyrene/plasticizer ratio is 40/60, has a viscosity suitable for knife coating.

Example II

A mixture of 11 parts of "Permalloy" flake (a magnetic alloy of iron and nickel), 33 parts of fine aluminum bronze powder (flake) and 20 parts of xylene is ground in a mortar for 10 minutes. Thirty parts of xylene and 60 parts of a 25% solution of polystyrene in xylene are added and the paint is stirred until homogeneous. The resulting paint, which has a pigment/binder ratio of 75/25 and a "Permalloy"/aluminum powder ratio of 25/75, has a suitable viscosity for film preparation by "spinning," i. e., pouring the paint on a rotating disc, as described in Gardiner's Physical and Chemical Examination of Paints, 1939, page 98.

One method of applying the above mentioned method of magnetic orientation consists in rotating the wet paint film between and in parallel relation to the poles of a magnet until it has dried sufficiently to permit removal from the field without causing deorientation of the flakes. As an example, a 20 mil coat of the paint composition of Example I is knifed on Cellophane attached by rubber cement to a 5" Bakelite disc. The disc is placed on a turn-table mounted between two electromagnets actuated by 220 volt direct current in such a way that a film placed thereon is approximately in the center of the field. The turn-table is rotated at about 30 R. P. M. The magnetic field is applied at a strength of about 100 gauss. The film is rotated for one hour, then air-dried overnight, after which the Cellophane is stripped from the Bakelite, soaked in water for one hour, and finally stripped from the pigmented film. The resulting detached film is pliable, stronger and brighter than a control film prepared outside the magnetic field.

Likewise, a film is prepared by pouring a portion of the paint of Example II on a 5" paper disc rotating at 250 R. P. M. The paper disc is transferred immediately to the turn-table, which is rotated for one hour at 30 R. P. M. in a magnetic field of about 100 gauss. A second coat of paint is then applied and the procedure repeated. After air-drying for 6 hours and baking at 65° C. for two days, the resulting film is brighter than a control film prepared outside the magnetic field.

The compositions of this invention may comprise any ferromagnetic pigment such as iron, iron alloys, steel, alloy steels, the "Permalloy" alloys, magnetic iron oxide, etc., and any non-magnetic metallic flake pigment such as aluminum, copper, bronze, silver, gold, etc. Since the compositions are particularly useful in connection with the process of magnetic orientation, it is preferred that they contain enough ferro-magnetic pigment to render the pigment mixture responsive to the action of a magnet of practical field strength, i. e., between 5 and 5000 gauss, in a vehicle of practical viscosity.

The intimate mixtures of non-magnetic and magnetic pigments described herein can be obtained by several methods, such as grinding the dry pigments together, mixing their dispersions in film-forming vehicles or in volatile solvents, evaporating a suspension of a magnetic pigment on the surface of the nonmagnetic flake pigment particles, pounding into flakes a massive mixture of nonmagnetic and magnetic metal, etc. In certain cases special methods are used. For example, an aluminum-iron alloy can be pounded into flake form, then treated with sodium hydroxide which dissolves the aluminum on the surface of the flakes, leaving a surface of ferromagnetic iron.

The pigment compositions can be formulated into paints with any desired film vehicle such as drying oils, varnishes, the various alkyd resins, amide-formaldehyde resins, polyethylene, polyisobutylene, nitrocellulose, methyl cellulose, polyvinyl alcohol, etc. For practical purposes, the vehicle should have a viscosity of at least 0.3 poise at 25° C. The paint compositions can contain other ingredients such as plasticizers, fillers, dispersing agents, non-metallic pigments, dyes, etc.

The present compositions are useful in all applications where metallic paints are desired. The invention is, as previously noted, of special value in providing compositions yielding high orientation of the flake by magnetic means and hence bright films from flake pigment comprising a large proportion of non-magnetic pigment.

As many apparently widely different embodiments of this invention may be made without departing from the spirit and scope thereof, it is to be understood that I do not limit myself to the specific embodiments thereof except as defined in the appended claims.

I claim:

1. A pigment composition the pigment content of which consists essentially of a mixture of discrete particles of non-magnetic flake metal pigment with discrete particles of ferromagnetic metal pigment and in which substantially all the metal flakes contained in said composition are susceptible to magnetic orientation when contained in an undried paint film, said pigment composition containing in preponderant amount thin aluminum flake pigment and from 10% to 25% by weight of the pigment mixture of ferromagnetic metal pigment.

2. A coating composition comprising a film-forming vehicle, a solvent and the mixture of non-magnetic flake pigment and ferromagnetic metal pigment defined in claim 1.

3. The pigment composition defined in claim 1 in which said ferromagnetic pigment is a magnetic alloy of iron and nickel.

BURT CARLTON PRATT.

REFERENCES CITED

The following references are of record in the file of this patent:

UNITED STATES PATENTS

| Number | Name | Date |
| --- | --- | --- |
| 2,184,769 | Alexander | Dec. 26, 1939 |
| 1,726,340 | Buttles | Aug. 27, 1929 |
| 1,292,206 | Woodruff | Jan. 21, 1919 |

FOREIGN PATENTS

| Number | Country | Date |
| --- | --- | --- |
| 226,286 | Heskett | Dec. 22, 1924 |

Certificate of Correction

Patent No. 2,456,313.                                                                December 14, 1948.

BURT CARLTON PRATT

It is hereby certified that error appears in the printed specification of the above numbered patent requiring correction as follows:

Column 3, line 53, for the word "methyl" read *ethyl*;

and that the said Letters Patent should be read with this correction therein that the same may conform to the record of the case in the Patent Office.

Signed and sealed this 19th day of April, A. D. 1949.

[SEAL]

THOMAS F. MURPHY,
*Assistant Commissioner of Patents.*